US010625340B2

(12) United States Patent
Kaneko (10) Patent No.: US 10,625,340 B2
(45) Date of Patent: Apr. 21, 2020

(54) METAL 3D PRINTER

(71) Applicant: SODICK CO., LTD., Kanagawa (JP)

(72) Inventor: Mikio Kaneko, Kanagawa (JP)

(73) Assignee: SODICK CO., LTD., Kanagawa (JP)

( * ) Notice: Subject to any disclaimer, the term of this patent is extended or adjusted under 35 U.S.C. 154(b) by 0 days.

(21) Appl. No.: 16/541,165

(22) Filed: Aug. 15, 2019

(65) Prior Publication Data
US 2019/0366437 A1  Dec. 5, 2019

Related U.S. Application Data

(63) Continuation of application No. 15/139,311, filed on Apr. 26, 2016, now abandoned.

(30) Foreign Application Priority Data

Apr. 27, 2015  (JP) ................................. 2015-090222

(51) Int. Cl.
| | |
|---|---|
| *B29C 67/00* | (2017.01) |
| *B22F 3/105* | (2006.01) |
| *B22F 3/24* | (2006.01) |
| *B33Y 30/00* | (2015.01) |
| *B33Y 40/00* | (2020.01) |

(52) U.S. Cl.
CPC .... *B22F 3/1055* (2013.01); *B22F 2003/1056* (2013.01); *B22F 2003/247* (2013.01); *B33Y 30/00* (2014.12); *B33Y 40/00* (2014.12); *Y02P 10/295* (2015.11)

(58) Field of Classification Search
CPC ..... B29C 64/379; B29C 64/393; B29C 64/40; B33Y 30/00; B33Y 50/02
See application file for complete search history.

(56) References Cited

U.S. PATENT DOCUMENTS

| | | | |
|---|---|---|---|
| 2006/0111807 A1* | 5/2006 | Gothait | B29C 64/386 700/119 |
| 2006/0208396 A1* | 9/2006 | Abe | B29C 64/153 425/174.4 |

* cited by examiner

*Primary Examiner* — Joseph S Del Sole
*Assistant Examiner* — Thu Khanh T Nguyen
(74) *Attorney, Agent, or Firm* — JCIPRNET (57) ABSTRACT

A metal 3-D printer includes a powder layer formation device having a blade for planarizing metal powder, a table driving device lowering a table by a predetermined lowering distance in anticipation of a formation of a powder layer, a laser irradiating device irradiating a laser beam at the powder layer to form a sintered layer having a predetermined upper surface region, a numerical control apparatus controlling the powder layer formation device, the table driving device, the laser irradiating device and a machining apparatus. When the blade collides with an obstacle formed on an upper most sintered layer, an end mill is lowered according to a predetermined lowering distance such that a lower end of the end mill is lower than an upper surface of the powder layer, and moves the end mill across a predetermined upper surface region of the uppermost sintered layer to remove the obstacle.

3 Claims, 6 Drawing Sheets

METAL 3D PRINTER

CROSS-REFERENCE TO RELATED APPLICATION

This application is a continuation application of and claims the priority benefit of a prior application Ser. No. 15/139,311, filed on Apr. 26, 2016. The prior application Ser. No. 15/139,311 claims the priority benefit of Japan Application No. 2015-090222, filed on Apr. 27, 2015. The entirety of each of the above-mentioned patent applications is hereby incorporated by reference herein and made a part of this specification.

BACKGROUND OF THE DISCLOSURE

Field of the Disclosure

The disclosure relates to a 3-D printer for additive manufacturing of a three-dimensional object, and relates particularly to a 3-D printer having a blade for planarizing metal powder, and forms a powder layer on a suitable substrate or a sintered layer.

Description of Related Art

Patent Document 1 discloses a 3-D printer which molds a three-dimensional object by forming multiple layers of material. This 3-D printer moves a powder dispenser horizontally to form the powder layer in the molding space. The powder dispenser includes a hopper which supplies powder material and a drum which planarizes the powder material. A component which planarizes a powder layer, such as the drum, is referred to as a blade. The 3-D printer forms a sintered layer by irradiating a laser beam on a particular region of the powder layer. A three-dimensional object is molded by repeatedly forming this type of sintered layer.

When metal powder is used in a 3-D printer, the blade may collide with an obstacle on the sintered layer. When the laser beam is irradiated on the powder layer, sparks including molten metal may scatter onto the sintered layer. In this way, protrusions which have hardened to an irregular shape or which have not hardened sufficiently may be formed on the sintered layer unintentionally. Typically, a size of the metal powder is 10-50 µm, and a thickness of a single powder layer is set to 50 µm. In that case, the blade will collide with protrusions having a height greater than 50 µm, and molding is temporarily stopped. The obstacle, generally, is large enough of a protrusion that the blade may collide.

Patent Document 2 discloses a 3-D printer for piecewise removal of obstacles using a cutting tool. When the blade collides with an obstacle, this 3-D printer makes the blade retreat from the obstacle and then removes an upper part of the obstacle. After piecewise removal of the obstacle, formation of the powder layer is resumed.

Patent Document 2 also discloses an alternative method of forming a powder layer to be thicker than the desired sintered layer, then removing the surplus thickness from the sintered layer that was formed. In this alternative method, all of the obstacles are removed piecewise along with the surplus thickness, and a powder layer is formed on the sintered layer which has had all of the obstacles removed piecewise.

Many of the obstacles are minute, namely, protruding by a height only about a few µm from the powder layer. Therefore, it is difficult to contact a cutting edge that is formed on a side surface of a standard cutting tool to only the upper part of the obstacle. As such, the upper part of the obstacle may remain and not be completely removed. In that case, when formation of the powder layer is resumed, the blade may collide with the same obstacle again. Due to this, molding time may be unnecessarily long.

In the alternative method of Patent Document 2, the surplus thickness is removed each time a sintered layer is formed even if an obstacle is not formed. As a result, molding time becomes unnecessarily long. For example, when the height of a sintered layer is set to 50 µm, a metal 3-D printer is required to perform the removal of the surplus thickness 2000 times in order to mold a product with a height of 100 mm.

PRIOR ART LITERATURE

Patent Documents

Patent Document 1: U.S. Pat. No. 4,863,538
Patent Document 2: U.S. Pat. No. 7,754,135

SUMMARY OF THE DISCLOSURE

In view of the forgoing situation, an objective of the disclosure is to provide a metal 3-D printer which may ensure the removal of an obstacle and reduce time required for removing the obstacle. Other objectives and advantages of the disclosure are described in the description that follows.

The disclosure relates to a metal 3-D printer including a table movable in a vertical direction, a powder layer formation device having at least one blade for planarizing metal powder and moving the at least one blade in a horizontal axis direction to form a powder layer on the table, a table driving device lowering the table by a predetermined lowering distance in anticipation of a formation of the powder layer, a laser irradiating device irradiating a laser beam at the powder layer to form a sintered layer having a predetermined upper surface region, a machining apparatus having a cutting tool and moving the cutting tool, and a numerical control apparatus controlling the powder layer formation device, the table driving device, the laser irradiating device and the machining apparatus. The numerical control apparatus includes a memory which stores the predetermined lowering distance and the predetermined upper surface region, and a collision detector generating a detection signal representing the at least one blade has collided with an obstacle formed on an upper most sintered layer, wherein, in response to the detection signal of the collision detector, the cutting tool is lowered according to the predetermined lowering distance such that a lower end of the cutting tool is lower than an upper surface of the powder layer, and the cutting tool is moved across the predetermined upper surface region of the uppermost sintered layer to remove the obstacle.

Here, "obstacle" is hardened or insufficiently hardened metal that has scattered to the sintered layer from an irradiation position when the laser beam is irradiated on the powder layer. The "obstacle", generally, is large enough of a metal that the blade may collide. The phrase "to form a powder layer on the table" includes forming the powder layer directly or indirectly on the table. In addition, "to form a powder layer on the table" also includes forming the powder layer on a suitable substrate placed on the table or on the sintered layer.

The cutting tool may be a rotating end mill. The powder layer formation device has a servo motor for moving the at least one blade, and the collision detector generates the detection signal when a current supplied to the servo motor increases and exceeds a set value.

In response to the detection signal of the collision detector, the numerical control apparatus lowers the cutting tool such that the lower end of the cutting tool is lower than the upper surface of the powder layer by the predetermined lowering distance.

Alternatively, data representing a correction distance is stored in the memory, and in response to the detection signal of the collision detector, the numerical control apparatus lowers the cutting tool such that the lower end of the cutting tool is lower than the upper surface of the powder by a distance of the predetermined lowering distance added to the correction distance.

Alternatively, when the powder layer formation device is forming the powder layer, the numerical control apparatus moves the cutting tool to a retracted position such that the lower end of the cutting tool is higher than the upper surface of the powder layer by a predetermined height, and in response to the detection signal of the collision detector, the numerical control apparatus lowers the cutting tool from the retracted position by a distance of the predetermined height and the correction distance added to the predetermined lowering distance.

In the disclosure, the obstacle on the sintered layer is removed only when the blade collides with the obstacle. As such, in comparison to a case where the upper surface region of the sintered layer is removed each time the sintered layer is formed, the time required for removing the obstacle is reduced.

In addition, the cutting tool is lowered such that the lower end of the cutting tool is lower than at least the upper surface of the powder layer, therefore removal of the obstacle is ensured. Furthermore, the lowering distance of the cutting tool is the lowering distance of the table, in other words, set to be equivalent to the thickness of the powder layer. As a result, an operator is not required to input the lowering distance of the end mill, therefore problems by an input error of the operator do not occur. In addition, removal of the obstacle is ensured even if the thickness of the powder layers change.

DESCRIPTION OF THE EMBODIMENTS

Figure 1:
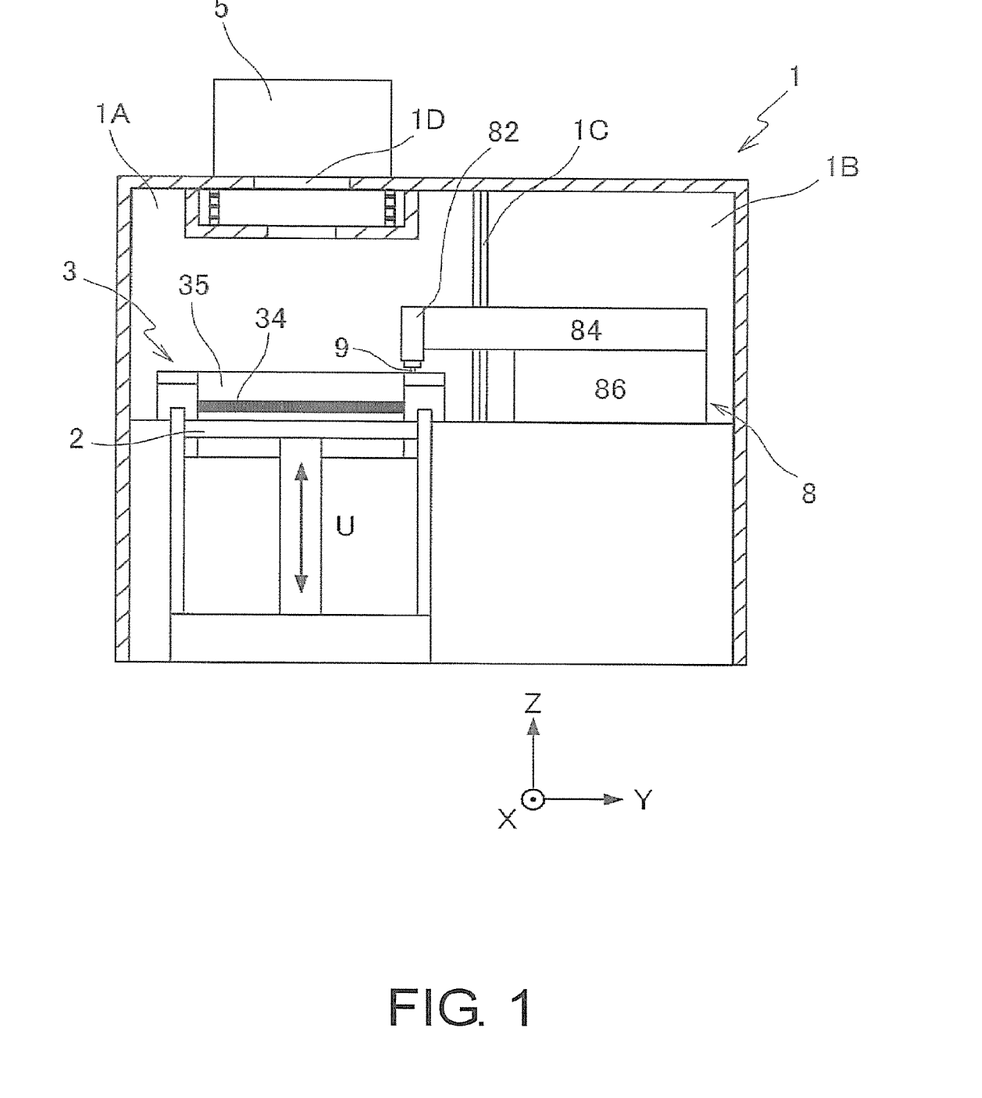
FIG. 1 is a side view diagram illustrating a metal 3-D printer according to an embodiment of the disclosure.

Embodiments of the disclosure accompanied with figures are described in detail. As shown in FIG. 1, a metal 3-D printer 1 has a molding room 1A and a driving device room 1B. The molding room 1A is disposed at a front side of the metal 3-D printer 1, and the driving device room 1B is disposed behind the molding room 1A. The molding room 1A and the driving device room 1B are separated by a bellows 1C.

It is known that when metal powder is sintered by a laser beam, a special smoke referred to as fume is generated. If the fume in the molding room 1A shields the laser beam, a required energy of the laser beam may not reach the powder layer. During molding, an inert gas supply device (not illustrated) supplies clean inert gas to the molding room 1A and the driving device room 1B respectively, such that the fume does not shield the laser beam. A molding space, for forming multiple layers of metal material, is provided in the molding room 1A. A table 2 is housed in the molding room 1A. The molding space is formed at an entire region of an upper side of the table 2. The table 2 moves down by a height corresponding to the thickness of the powder layer in anticipation for a formation of the powder layer.

Figure 2:
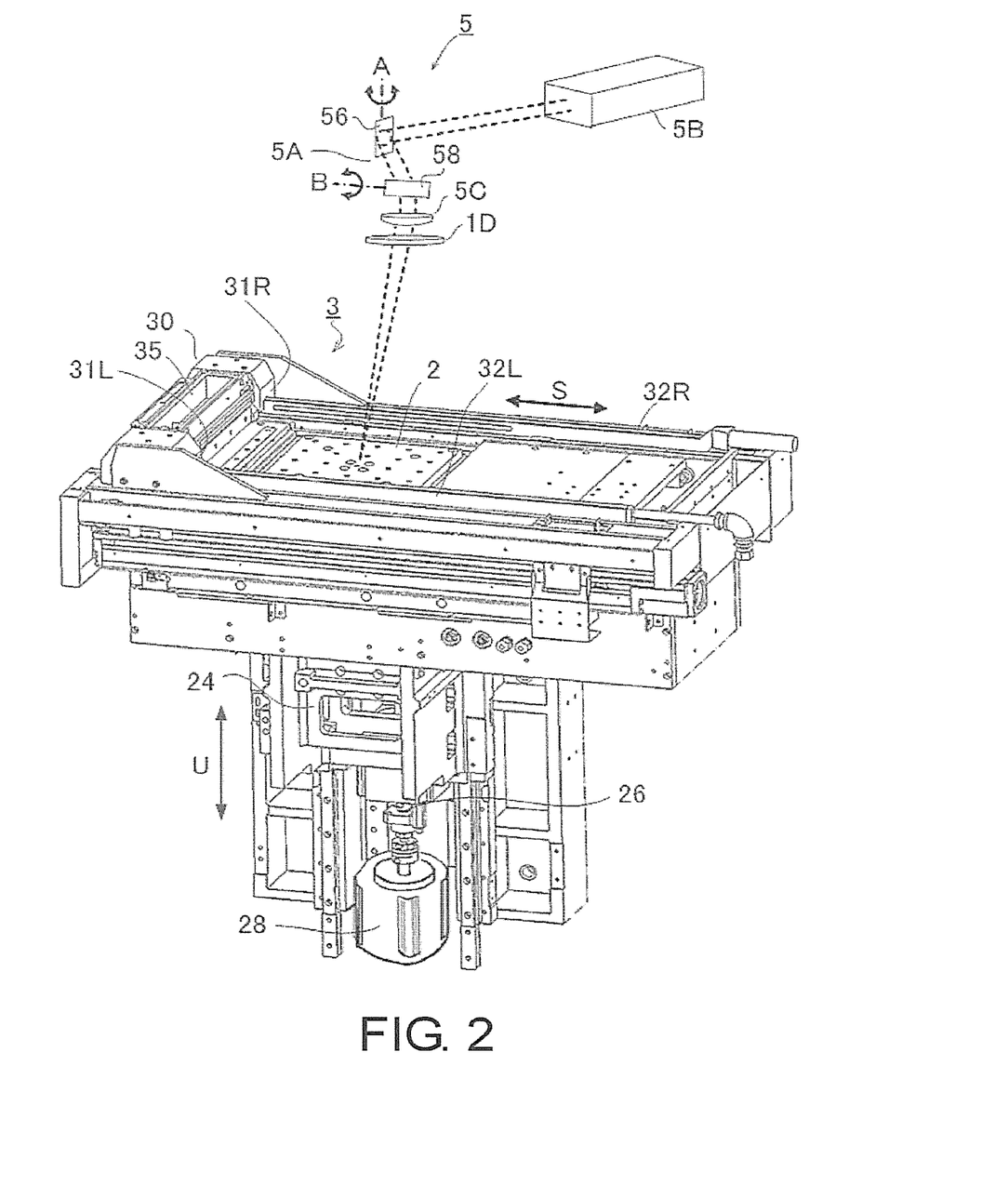
FIG. 2 is a perspective view illustrating a metal 3-D printer of FIG. 1.

As shown in FIG. 2, the metal 3-D printer 1 includes a slider 24, a transmission device 26 and a table driving device. The slider 24 supports the table 2, and is configured to be movable in a vertical U axis direction. The transmission device 26 includes a coupling, a ball screw and a nut, wherein the nut is attached to the slider 24. The table driving device includes a motor 28, wherein rotation of the motor 28 is converted to a vertical movement of the slider 24 by the transmission device 26.

As shown in FIG. 2, a powder layer formation device 3, which forms a powder layer of a predetermined thickness on the table 2, includes a recoating head 30 and a pair of guide rails 32R, 32L. The recoating head 30 supplies the metal powder onto the table 2, a suitable substrate or the sintered layer by moving in a horizontal S axis direction.

Figure 3:
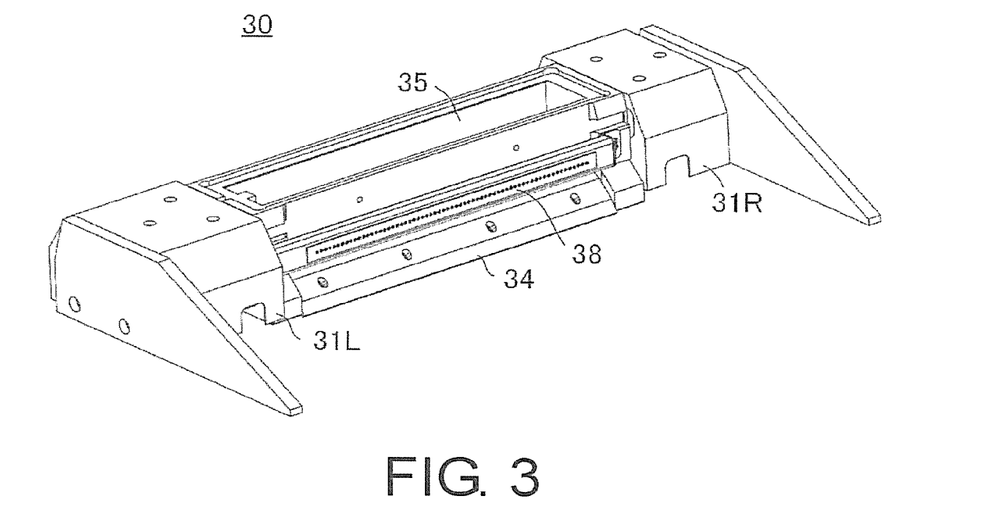
FIG. 3 is a perspective view of a recoating head of FIG. 2 viewed from the top side.
Figure 4:
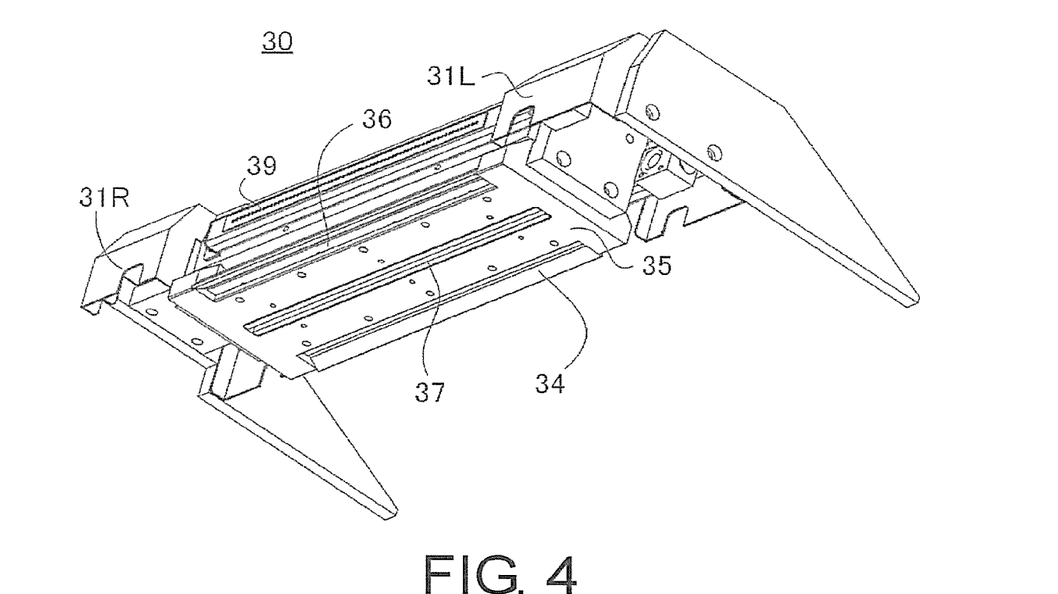
FIG. 4 is a perspective view of a recoating head of FIG. 2 viewed from the bottom side.

As shown in FIGS. 3 and 4, the recoating head 30 includes a material container 35, blades 34, 36, and a pair of bearings 31R, 31L. The material container 35 collects metal powder, and a discharge port 37 is formed at a bottom of the material container 35. The discharge port 37 extends in a horizontal direction that is orthogonal to the S axis, and is opened and closed by a suitable shutter. When the recoating head 30 is at a retracted position, the discharge port 37 is closed. When the recoating head 30 is moving forward to form a powder layer, the discharge port 37 is open and metal powder drops down.

The blades 34, 36 planarize the metal powder dropped down from the discharge port 37. The blades 34, 36 extend in a horizontal direction that is orthogonal to the S axis, and are disposed next to the discharge port 37. The blade 34 is disposed in front of the discharge port 37, and the blade 36 is disposed behind the discharge port 37. The pair of guide rails 32R, 32L extend parallel with the S axis. The bearings 31R, 31L are engaged with the guide rails 32R, 32L respectively, and the guide rails 32R, 32L guide the recoating head 30 in the S axis direction. A suction pipe for sucking the fume is disposed at the guide rail 32R. A supply pipe for supplying inert gas is disposed at the guide rail 32L.

Suction ports 38, 39 for sucking fume are formed at a front surface and a rear surface respectively of the recoating head 30. The fume sucked by the suction ports 38, 39 is discharged out of the molding room 1A. A fixed material supply device (not illustrated) which supplies metal powder to the material container 35 is provided. Metal powder is replenished to the material container 35 from the material supply device at suitable times, such that there is no shortage of metal powder in the material container 35 during the molding period.

The powder layer formation device 3 includes a servo motor 4 which moves the recoating head 30 to reciprocate horizontally in the S axis direction along the pair of guide rails 32R, 32L. A rotation axis of the servo motor 4 is connected to the recoating head 30 by a suitable transfer mechanism. The transfer mechanism, for example, is constructed by a ball screw and a nut.

A laser irradiating device 5 irradiates a laser beam on a predetermined region of the powder layer. The laser irradiating device 5, as shown in FIG. 2, includes a laser scanning apparatus 5A, a laser oscillator 5B, a focus lens 5C and a plurality of laser transfer components (not illustrated). The laser scanning apparatus 5A is disposed on a ceiling of the molding room 1A, and includes a pair of galvanometer mirrors 56, 58. The upper galvanometer mirror 56 is supported to rotate or oscillate around a horizontal A axis. The lower galvanometer mirror 58 is supported to rotate or oscillate around a horizontal B axis. The B axis is orthogonal to the A axis.

The laser beam with a predetermined energy which is outputted from the laser oscillator 5B arrives at the galvanometer mirrors 56, 58 through the laser transfer components. The laser beam reflected by the pair of galvanometer mirrors 56, 58 is converged using the focus lens 5C and passes through a transmission lens 1D. As shown in FIG. 1, the transmission lens 1D is disposed on a hole formed on the ceiling of the molding room 1A. The laser beam converged by the focus lens 5C is irradiated on the powder layer by a spot diameter that is predetermined.

As shown in FIG. 1, a machining apparatus 8 includes a Y moving body 86 and an X moving body 84. The Y moving body 86 is driven by a Y linear motor 42, and is movable in a horizontal Y axis direction. The X moving body 84 is driven by an X linear motor 52, and is movable in a horizontal X axis direction that is orthogonal to the Y axis. The Y moving body 86 and a majority of the X moving body 84 are disposed in the driving device room 1B.

A machining head 82 is attached to a front surface of the X moving body 84. The machining head 82 is movable in a vertical Z axis direction through a Z linear motor 62. A suitable spindle is rotatably disposed in the machining head 82. An end mill 9, which is a cutting tool, is attached vertically to the spindle. A cutting edge for performing machining is formed on a side surface of the end mill 9.

The X linear motor 52, the Y linear motor 42 and the Z linear motor 62 are controlled by a numerical control apparatus 10. In this way, the numerical control apparatus 10 moves the end mill 9 in the X axis, the Y axis and the Z axis direction, such that a position of a lower end 9A of the end mill 9 may be controlled to any height in the molding room 1A. The sintered layer may be machined by the cutting edge of the rotating end mill 9.

Figure 5:
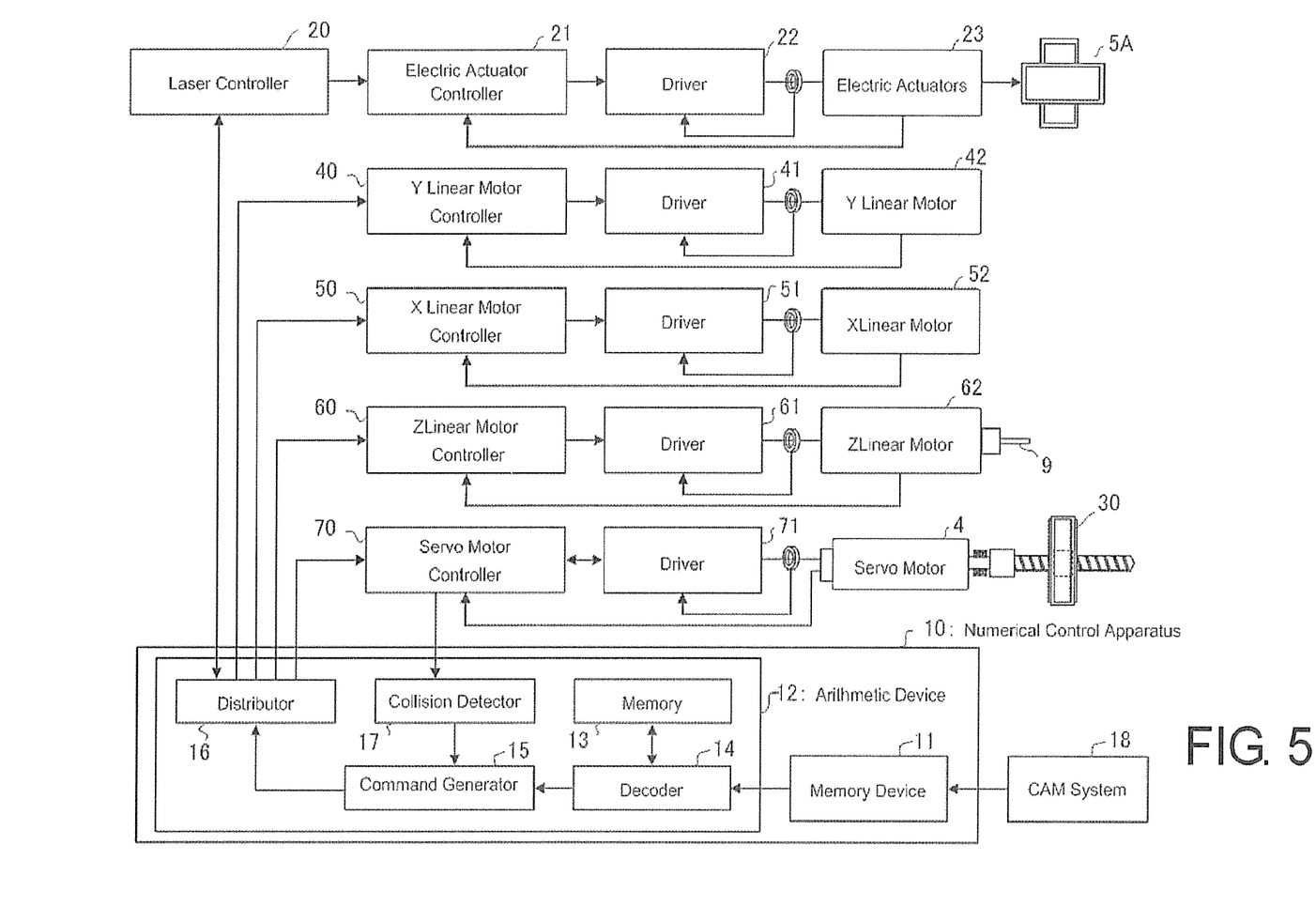
FIG. 5 is a block diagram illustrating an example of a CAM system and a numerical control apparatus.

As shown in FIG. 5, the metal 3-D printer 1 includes a CAM system 18, the numerical control apparatus 10, a laser controller 20, a servo motor controller 70, a Y linear motor controller 40, an X linear motor controller 50 and a Z linear motor controller 60. The CAM system 18 constructs a molding program for molding a 3-dimensional object. The molding includes: formation of a powder layer; formation of a sintered layer; and machining by an end mill.

The numerical control apparatus 10 is constructed by a memory device 11 and an arithmetic device 12. The memory device 11, for example, is a hard disk which stores the molding program. In anticipation for a formation of a powder layer, data representing a lowering distance d for lowering the table 2 is included in the molding program. The arithmetic device 12 includes a decoder 14, a memory 13, a command generator 15, a distributor 16 and a collision detector 17. The decoder 14 decodes the molding program that is stored in the memory device 11. The memory 13 is memory for temporarily storing the decoded molding program. The command generator 15 generates a command according to the decoded molding program. The distributor 16 distributes the command from the command generator 15 to various controllers.

The numerical control apparatus 10 generates a command position which sets a height of the table 2, and controls the table driving device. The table driving device moves the table 2 in the U axis direction according to the command position. The numerical control apparatus 10 generates a move command which sets the forward movement or the backward movement of the recoating head 30, and controls the servo motor 4 of the powder layer formation device 3 in cooperation with the servo motor controller 70. The servo motor 4 moves the recoating head 30 in the S axis direction. The servo motor controller 70 for controlling the servo motor 4 is disposed between the numerical control apparatus 10 and the servo motor 4.

The distributor 16 of the numerical control apparatus 10 provides the move command to the servo motor controller 70. An angular position of the servo motor 4 is detected, and the detected position is fed-back to the servo motor controller 70. When the move command is inputted to the servo motor controller 70, a command current is supplied to a driver 71. The driver 71 supplies a driving current to the servo motor 4 according to the command current. In this way, the recoating head 30 moves in the S axis direction at a predetermined speed.

A current probe for detecting the current supplied to the servo motor 4 is disposed between the driver 71 and the servo motor 4. The detected current is fed-back to the driver 71 from the current probe, and the driver 71 corrects the driving current. A signal representing the detected current is provided to the collision detector 17 through the driver 71 and the servo motor controller 70.

The numerical control apparatus 10 generates a scan position command which sets a location on the powder layer to irradiate the laser beam, a scan speed command which sets a speed to move the laser beam on the irradiation position, and controls the laser irradiating device 5 in cooperation with the laser controller 20. A pair of electric actuators 23 are disposed to rotate or oscillate a mirror surface of the galvanometer mirrors 56, 58 respectively. One of the electric actuators 23 is rotates or oscillates the galvanometer mirror 56 around the A axis, and the other electric actuator 23 rotates or oscillates the galvanometer mirror 58 around the B axis.

The distributor 16 of the numerical control apparatus 10 provides the scan position command and the scan speed command to the laser controller 20. The laser controller 20 provides the command position and command velocities of the A axis and the B axis to an electric actuator controller 21 according to the scan position command and the scan speed command. In addition, a position of the A axis and the B axis of the pair of electric actuators 23 are detected, and the detected positions are fed-back to the electric actuator controller 21.

The laser controller 20 supplies the command current to a driver 22 according to the command position, the command velocity and the detected position. In this way, the irradiation position of the laser beam moves on the powder layer at the scan speed command. A current probe for detecting a current supplied to the pair of electric actuators is disposed between the driver 22 and the pair of electric actuators 23. The detected current is fed-back to the driver 22 from the current probe, and the driver 22 corrects the driving current.

The numerical control apparatus 10 generates a command which sets a position and a speed of the end mill 9, and controls the machining apparatus 8 in cooperation with the Y linear motor controller 40, the X linear motor controller 50 and the Z linear motor controller 60. The Y linear motor 42 moves the Y moving body 86 in the Y axis direction. The Y linear motor controller 40 for controlling the Y linear motor 42 is disposed between the numerical control apparatus 10 and the Y linear motor 42.

The distributor 16 of the numerical control apparatus 10 provides the command position and the command velocity to the Y linear motor controller 40. In addition, a position of the Y linear motor 42 is detected, and the detected position is fed-back to the Y linear motor controller 40. The Y linear motor controller 40 supplies a command current to a driver 41 according to the command position, the command velocity and the detected position. The driver 41 supplies a driving current to the Y linear motor 42 corresponding to the command current. In this way, the Y moving body 86 moves in the Y axis direction at the command velocity. A current probe for detecting a current supplied to the Y linear motor 42 is disposed between the driver 41 and the Y linear motor 42. The detected current is fed-back to the driver 41 from the current probe, and the driver 41 corrects the driving current.

The X linear motor 52 moves the X moving body 84 in the X axis direction. The X linear motor controller 50 for controlling the X linear motor 52 is disposed between the numerical control apparatus 10 and the X linear motor 52. The distributor 16 of the numerical control apparatus 10 provides the command position and the command velocity to the X linear motor controller 50. In addition, a position of the X linear motor 52 is detected, and the detected position is fed-back to the X linear motor controller 50. The X linear motor controller 50 supplies a command current to a driver 51 according to the command position, the command velocity and the detected position. In this way, the X moving body 84 moves in the X axis direction at the command velocity. A current probe for detecting a current supplied to the X linear motor 52 is disposed between the driver 51 and the X linear motor 52. The detected current is fed-back to the driver 51 from the current probe, and the driver 51 corrects the driving current.

The Z linear motor 62 moves the machining head 82 in the Z axis direction. The Z linear motor controller 60 for controlling the Z linear motor 62 is disposed between the numerical control apparatus 10 and the Z linear motor 62. The distributor 16 of the numerical control apparatus 10 provides the command position and the command speed to the Z linear motor controller 60. In addition, a position of the Z linear motor 62 is detected, and the detected position is fed-back to the Z linear motor controller 60. The Z linear motor controller 60 supplies a command current to a driver 61 according to the command position, the command velocity and the detected position. In this way, the machining head 82 moves in the Z axis direction at the command velocity. A current probe for detecting a current supplied to the Z linear motor 62 is disposed between the driver 61 and the Z linear motor 62. The detected current is fed-back to the driver 61 from the current probe, and the driver 61 corrects the driving current.

A process of the metal 3-D printer 1 molding a 3-dimensional object by forming multiple layers of metal material is described in detail with reference to FIG. 5. First, the molding program of a 3-dimensional object is constructed by the CAM system 18 according to a model of the 3-dimensional object. The molding program includes molding conditions, and are stored in the memory device 11 of the numerical control apparatus 10. The molding program in the memory device 11 is taken in by the arithmetic device 12 of the numerical control apparatus 10. The molding program is stored in the memory 13 and is decoded by the decoder 14. The decoder 14 provides the decoded molding program to the command generator 15. The command generator 15 generates various commands in the decoding order of the molding program. The commands are provided to a suitable controller by the distributor 16.

In response to a move command, the servo motor controller 70 controls the servo motor 4 such that the recoating head 30 moves in the horizontal S axis direction in the molding space. Along with the forward movement of the recoating head 30, metal powder in the material container 35 drops down from the discharge port 37. The metal powder is planarized by the blades 34, 36. In this way, a first powder layer is formed on the table 2 or an appropriate base plate. The laser beam is irradiated on a predetermined region of the first powder layer, and a first sintered layer is formed. After the first sintered layer is formed, the table 2 and the slider 24 are lowered in the vertical U axis direction by the lowering distance d. The lowering distance d is equivalent to a thickness of the next powder layer.

A second powder layer is formed on the first sintered layer. The laser beam is irradiated on a predetermined region of the second powder layer, and a second sintered layer is formed. In this way, the formation of a sintered layer is repeated, and the desired 3-dimensional object is molded. The lowering distance d of the table 2, in other words the thickness of the powder layer, may be constant or may vary. The machining apparatus 8 finishes a side surface of the sintered layer when each or a plurality of sintered layers are formed.

Figure 6:
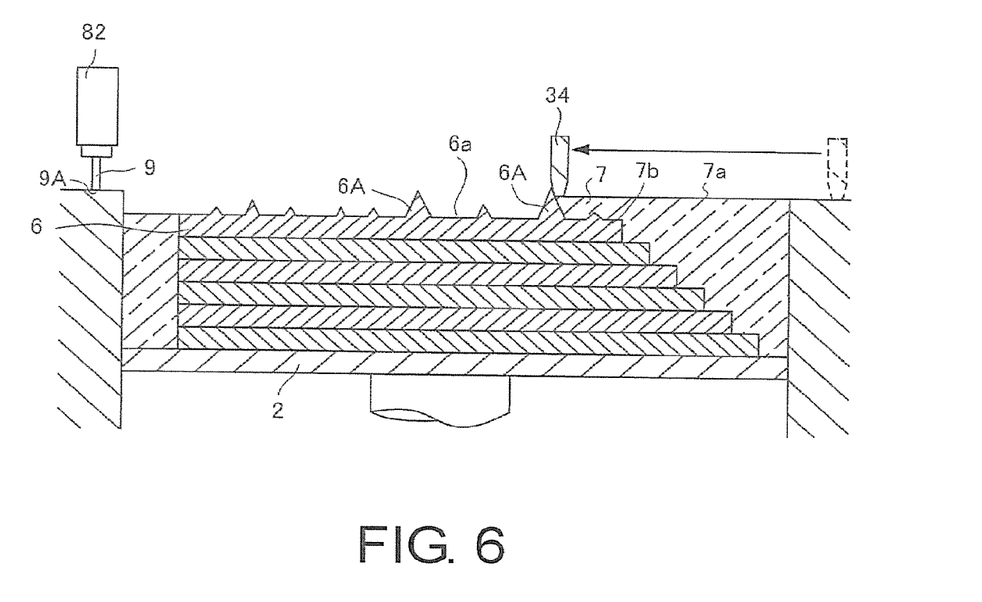
FIG. 6 is a side view diagram illustrating a tool in a retreat position and a blade colliding with an obstacle.
Figure 7:
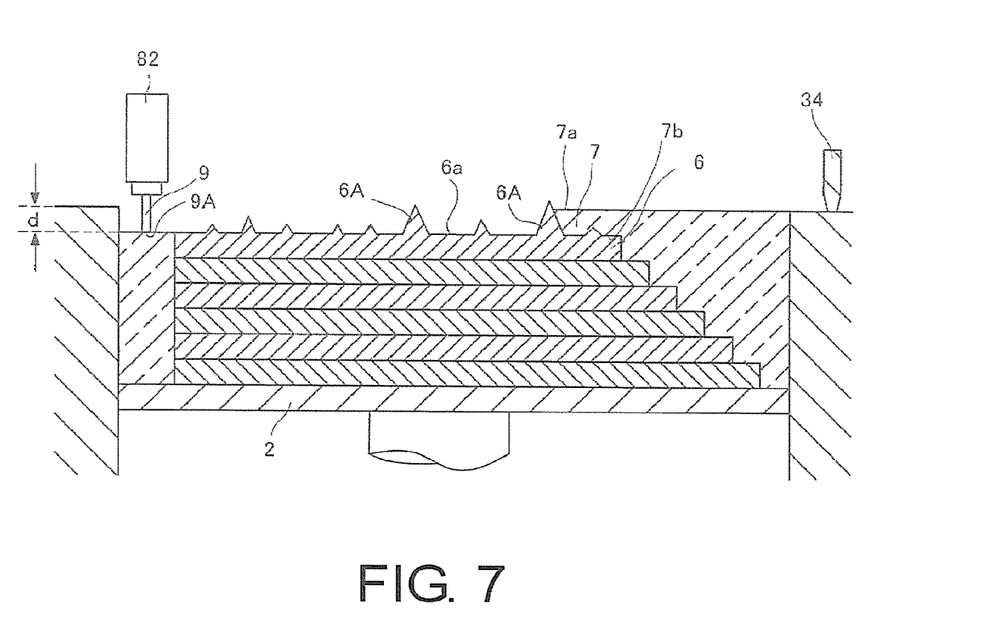
FIG. 7 is a side view diagram illustrating a tool in a lowered position and a blade which has returned to a retreat position.
Figure 8:
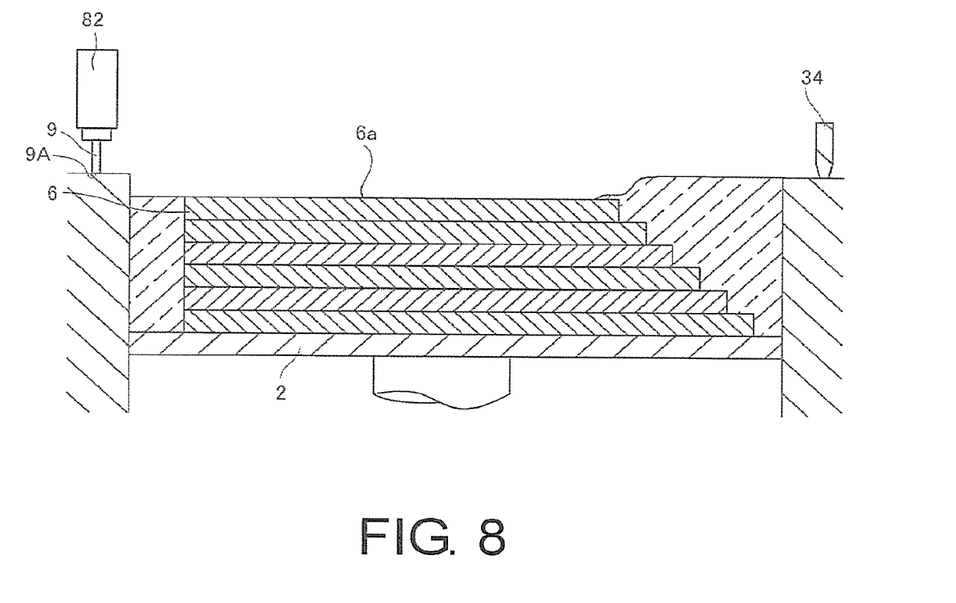
FIG. 8 is a side view diagram illustrating a tool which has returned to a retreat position.

When the blade 34 of the metal 3-D printer 1 collides with an obstacle, the obstacle is removed by the machining apparatus 8. As a result, the 3-dimensional object is molded without being stopped. A movement of the metal 3-D printer 1 when the blade 34 collides with an obstacle is described in detail with reference to FIGS. 5, 6, 7 and 8. In FIGS. 6, 7 and 8, six sintered layers are formed. Reference numeral 7 represents the powder layer formed on top of the upper most sintered layer 6.

As shown in FIG. 6, protrusions of varying sizes are formed on the sixth sintered layer 6. In FIG. 6, the blade 34 which is moved horizontally from a retracted position at the right side to the left is in collision with an obstacle 6A. During the formation of the powder layer, the end mill 9 is stopped at the retracted position at the left side, and the lower end 9A of the end mill 9 is at the same height of an upper surface 7a of the powder layer 7. In a case when the blade 34 collides with the obstacle 6A, the detected current of the current probe rises. As shown in FIG. 5, the collision detector 17 constantly monitors the detected current. The collision detector 17 compares the detected current with a set value. When the detected current exceeds the set value, the collision detector 17 detects that the blade 34 has collided with the obstacle 6A. A detection signal representing the collision is provided to the command generator 15.

The command generator 15 generates a cut-off command in response to the detection signal of the collision detector 17. The cut-off command is provided to the servo motor controller 70 through the distributor 16. As a result, the command current of the servo motor controller 70 is cut off, and the current supplied from the driver 71 to the servo motor 4 is stopped. In this way, the servo motor 4 is stopped, and the blade 34 elastically rebounds with respect to the obstacle 6A and runs to the right horizontally in FIG. 6.

After a predetermined time, the command generator 15 provides a move command to the servo motor controller 70 in an opposite direction. The driver 71 resumes supplying current to the servo motor 4, and the blade 34 moves to the right in FIG. 6 and returns to the retracted position. FIG. 7 illustrates the blade 34 returned to the retracted position. The command generator 15 obtains data representing the lowering distance d from the molding program stored in the memory 13. The command generator 15 provides a command position for removing the obstacle 6A to the Y linear motor controller 40, the X linear motor controller 50 and the Z linear motor controller 60 through the distributor 16.

As shown in FIG. 7, the machining apparatus 8 lowers the end mill 9 by a distance corresponding to the lowering distance d in response to a command from the command generator 15. In the present embodiment, the lowering distance of the end-mill 9 is the lowering distance d of the table 2, in other words, equivalent to a thickness of the powder layer 7. As a result, the lower end 9A of the end mill 9 is at a lower surface 7b of the powder layer 7, in other words, equivalent to a height of an upper surface 6a of the sintered layer 6. The rotating end mill 9 of the machining apparatus 8 is moved horizontally across the upper surface 6a of the sintered layer 6, and the blade of the end mill 9 is contacted to the base of the protrusions. In this way, as shown in FIG. 8, all of the protrusions on the sintered layer 6, including the obstacle 6A, are removed by the blade of the end mill 9. Then, formation of the powder layer 7 is resumed.

In the present embodiment, the end mill 9 does not level the sintered layer for each of the sintered layers that are formed. The end mill 9 removes the obstacle 6A only when the blade 34 collides with the obstacle 6A. In this way, the time required for molding may be shortened since the time required for removing the obstacle 6A is reduced.

In addition, the lowering distance d for lowering the table 2, in anticipation of the formation of a powder layer, is used as the lowering distance of the end mill 9. In this way, an operator is not required to input the lowering distance of the end mill 9 to the numerical control apparatus 10 in anticipation of the removal of the obstacle 6A. Removal of the obstacle 6A is ensured by lowering the lower end 9A of the end mill 9 to the height of the lower surface 7B of the powder layer 7, and moving the lower end 9A of the end mill 9 along the upper surface 6a of the sintered layer 6.

In addition, the lowering distance of the end mill 9 is dependent on the lowering distance d of the table 2. As such, the lowering distance of the end mill 9 is a value adapted for removing the obstacle 6A even if thicknesses of the powder layers that are formed are different.

The embodiment was chosen in order to explain the principles of the disclosure and its practical application. Many modifications and variations are possible in light of the above teachings. It is intended that the scope of the disclosure be defined by the claims.

In the present embodiment, the lowering distance of the end mill 9 is equivalent to the lowering distance d of the table 2. Alternatively, the lowering distance of the end mill 9 may be a value of the lowering distance d of the table 2 corrected by a predetermined correction distance $\Delta d$. In this case, the operator sets the correction distance $\Delta d$ before molding, and the molding program includes data representing the predetermined correction distance $\Delta d$. When the collision detector 17 detects a collision of the blade 34 and the obstacle 6A, the command generator 15 obtains data representing the lowering distance d and the correction distance $\Delta d$ from the molding program stored in the memory 13. The command generator 15 provides the command position for lowering the end mill 9 to the Z linear motor controller 60 through the distributor 16 according to the lowering distance d and the correction distance $\Delta d$.

Figure 9:
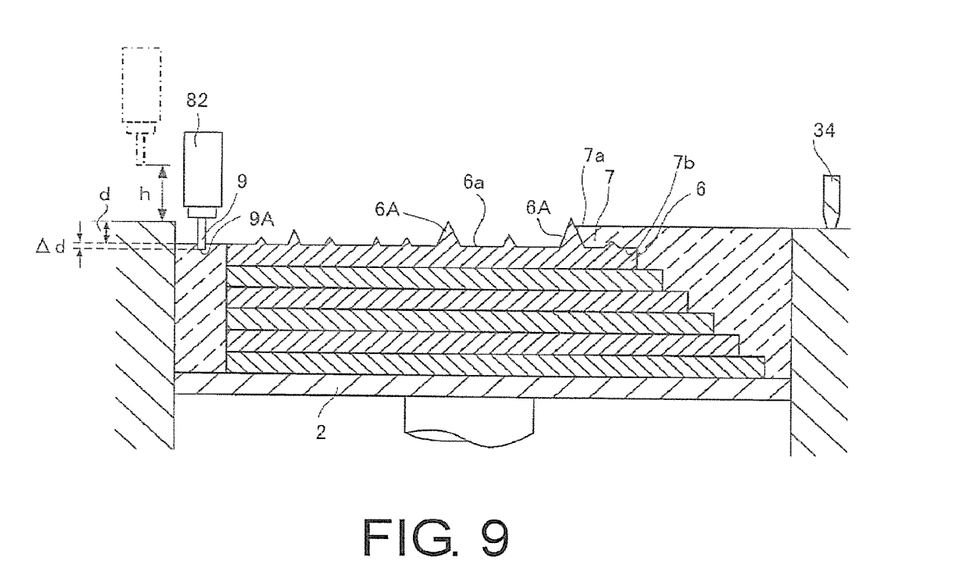
FIG. 9 is a side view diagram illustrating a tool in a lowered position and a blade which has returned to a retreat position.

As shown in FIG. 9, the numerical control apparatus 10 lowers the end mill 9 by a distance which is the correction distance $\Delta d$ added to the lowering distance d. Since the thickness of the sintered layer shrinks compared to the original powder layer, the correction distance $\Delta d$ may be set according to a difference in the thicknesses of the powder layer and the sintered layer. The correction distance $\Delta d$ may be set according to a material of the metal powder. In order to save time required for removing the obstacle 6A, the correction distance $\Delta d$ may be a negative value. In that case, the numerical control apparatus 10 controls the machining apparatus 8 to lower the end mill 9 according to a predetermined lowering distance d such that the lower end 9A of the end mill 9 is lower than the upper surface 7a of the powder layer 7.

In the present embodiment, when the end mill 9 is at the retracted position, the lower end 9A of the end mill 9 is at a same height as the upper surface 7a of the powder layer 7. However, a retracted position of the end mill 9 is not limited thereto. Alternatively, when the powder layer formation device 3 is forming the powder layer 7, the numerical control apparatus 10 may move the end mill to a retracted position represented by the dash-dot-dash line in FIG. 9. When the end mill 9 is at this retracted position, the lower end 9A of the end mill 9 is higher than the upper surface 7a of the powder layer 7 by a predetermined height h. Data representing the predetermined height h may be stored in the memory 13. In this case, in order to remove the obstacle 6A, the numerical control apparatus 10 lowers the end mill 9 by a distance which is the predetermined height h and the correction distance $\Delta d$ added to the lowering distance d of the table 2.

In the present embodiment, when the blade 34 collides with the obstacle 6A, the metal 3-D printer 1 stops the servo motor 4, and the blade 34 runs to the right in FIG. 6. Alternatively, the blade 34 may be retracted from the obstacle 6A by rotating the servo motor 4 in reverse. In the present embodiment, the recoating head 30 includes two blades 34, 36, however, only one blade may be included as well.

What is claimed is:

1. A method of using a metal 3-D printer, wherein the metal 3-D printer comprises:
    a table, movable in a vertical direction;
    a powder layer formation device, comprising at least one blade for planarizing metal powder;
    a table driving device;
    a laser irradiating device;
    a machining apparatus, having a cutting tool, and moving the cutting tool; and
    a numerical control apparatus, controlling the powder layer formation device, the table driving device, the laser irradiating device and the machining apparatus, the numerical control apparatus comprising:

a memory which stores a predetermined lowering distance, a predetermined upper surface region, a predetermined height and data representing a correction distance;

a collision detector, and wherein the method comprises:

during formation of a powder layer, operating the machining apparatus so that a lower end of the cutting tool is moved to a retracted position such that the lower end of the cutting tool is higher than the upper surface of the powder layer by the predetermined height;

operating the powder layer formation device to move the at least one blade in a horizontal axis direction to form the powder layer on the table;

operating the table driving device to lower the table by the predetermined lowering distance in anticipation of the formation of the powder layer;

using the laser irradiating device to irradiate a laser beam at the powder layer to form a sintered layer having the predetermined upper surface region;

using the collision detector to generate a detection signal representing the at least one blade has collided with an obstacle formed on an upper most sintered layer, and operating the machining apparatus so that in response to the detection signal of the collision detector the cutting tool is lowered from the retracted position by a distance which is the predetermined height obtained from the memory and the correction distance added to the predetermined lowering distance such that the lower end of the cutting tool is lower than the upper surface of the powder layer, and that the cutting tool is moved across the predetermined upper surface region of the uppermost sintered layer as obtained from the memory to remove the obstacle, wherein the correction distance is set according to a difference in a thickness of the powder layer and the sintered layer.

2. The method of using the metal 3-D printer as claimed in claim 1, wherein the cutting tool is a rotating end mill.

3. The method of using the metal 3-D printer as claimed in claim 1, wherein the powder layer formation device has a servo motor for moving the at least one blade, and the collision detector generates the detection signal when a current supplied to the servo motor increases and exceeds a set value.

* * * * *